(12) United States Patent
Shimotsu et al.

(10) Patent No.: US 9,417,414 B2
(45) Date of Patent: Aug. 16, 2016

(54) OPTICAL CONNECTOR FOR A CARD INCLUDING CONCAVE AND CONVEX GUIDE PORTIONS

(75) Inventors: Akihiro Shimotsu, Ebina (JP); Masayuki Arai, Yokohama (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 13/384,059

(22) PCT Filed: Jul. 13, 2010

(86) PCT No.: PCT/US2010/041775
§ 371 (c)(1),
(2), (4) Date: Apr. 3, 2012

(87) PCT Pub. No.: WO2011/008727
PCT Pub. Date: Jan. 20, 2011

(65) Prior Publication Data
US 2012/0183264 A1    Jul. 19, 2012

(30) Foreign Application Priority Data

Jul. 13, 2009 (JP) ................................ 2009-164637

(51) Int. Cl.
*G02B 6/36* (2006.01)
*G02B 6/42* (2006.01)
(Continued)

(52) U.S. Cl.
CPC ............ *G02B 6/4292* (2013.01); *G02B 6/4201* (2013.01); *G02B 6/4293* (2013.01); *G02B 6/3885* (2013.01); *G02B 6/4214* (2013.01); *G02B 6/43* (2013.01)

(58) Field of Classification Search
CPC ............................ G02B 6/4292; G02B 6/4261
USPC .................................................. 385/76–77, 92
See application file for complete search history.

(56) References Cited

U.S. PATENT DOCUMENTS

| 4,149,026 A | 4/1979 | Fritz et al. |
| 5,039,195 A | 8/1991 | Jenkins et al. |

(Continued)

FOREIGN PATENT DOCUMENTS

| EP | 0932224 | 8/2002 |
| EP | 1 884 810 A1 | 2/2008 |

(Continued)

OTHER PUBLICATIONS

International Search Report and Written Opinion for PCT Patent Application No. PCT/US2010/0041742. Aug. 26, 2010.

(Continued)

*Primary Examiner* — Eric Wong
(74) *Attorney, Agent, or Firm* — Jeffrey K. Jacobs

(57) ABSTRACT

An optical connector is disclosed. The optical connector includes a cable having formed therein an optical waveguide, a plug having the cable connected thereto, and a connector housing configured to mount thereon the plug. The cable is provided with a cable-side guide portion. The plug is provided with a plug housing which has a plug-side guide portion and is attached to the cable. The connector housing is provided with a connector-side guide portion. The plug-side guide portion is configured to be engaged with the cable-side guide portion to achieve a positioning of the cable and the plug housing and be engaged with the connector-side guide portion to achieve a positioning of the connector housing and the plug.

15 Claims, 6 Drawing Sheets

(51) Int. Cl.
  *G02B 6/38* (2006.01)
  *G02B 6/43* (2006.01)

(56) References Cited

U.S. PATENT DOCUMENTS

| | | | |
|---|---|---|---|
| 5,356,308 | A | 10/1994 | Toba |
| 5,745,622 | A | 4/1998 | Birnbaum |
| 5,804,768 | A | 9/1998 | Sexton |
| 5,951,322 | A | 9/1999 | Nishikigi |
| 6,107,577 | A * | 8/2000 | Sexton .................. 174/117 F |
| 6,116,791 | A | 9/2000 | Laninga |
| 6,295,400 | B1 | 9/2001 | Shahid |
| 6,386,768 | B1 | 5/2002 | Yoon et al. |
| 6,438,301 | B1 | 8/2002 | Johnson et al. |
| 6,543,941 | B1 | 4/2003 | Lampert |
| 6,547,446 | B2 | 4/2003 | Yamaguchi |
| 6,623,173 | B1 | 9/2003 | Grois et al. |
| 6,764,225 | B2 | 7/2004 | Ngo et al. |
| 6,811,431 | B2 | 11/2004 | Hseih |
| 6,893,165 | B2 | 5/2005 | Ngo |
| 7,038,191 | B2 | 5/2006 | Kare et al. |
| 7,066,746 | B1 | 6/2006 | Togami et al. |
| 7,150,569 | B2 | 12/2006 | Oono |
| 7,226,217 | B1 | 6/2007 | Benton |
| 7,261,602 | B2 | 8/2007 | Lloyd |
| 7,312,520 | B2 | 12/2007 | Furuyama |
| 7,420,380 | B2 | 9/2008 | Kasukabe et al. |
| 7,435,145 | B2 | 10/2008 | Nishio et al. |
| 7,441,965 | B2 | 10/2008 | Furuno |
| 7,461,981 | B2 | 12/2008 | Yow et al. |
| 7,559,702 | B2 | 7/2009 | Fujiwara et al. |
| 7,578,623 | B2 | 8/2009 | Wang |
| 7,581,892 | B2 | 9/2009 | Daikuhara |
| 7,653,280 | B2 | 1/2010 | Fujii et al. |
| 7,747,116 | B2 | 6/2010 | Furuyama |
| 7,751,660 | B2 | 7/2010 | Ueno |
| 7,866,898 | B2 | 1/2011 | Ishikawa |
| 8,449,202 | B2 | 5/2013 | Shimotsu |
| 2006/0093277 | A1 | 5/2006 | Mulligan |
| 2007/0122090 | A1 * | 5/2007 | Nishio et al. .................... 385/92 |
| 2008/0013895 | A1 * | 1/2008 | Daikuhara ...................... 385/88 |
| 2009/0208168 | A1 * | 8/2009 | Ishikawa et al. ................ 385/14 |
| 2009/0239420 | A1 | 9/2009 | Nishio et al. |
| 2009/0297101 | A1 | 12/2009 | Ono |
| 2012/0114283 | A1 * | 5/2012 | Shimotsu et al. ............... 385/27 |
| 2012/0121223 | A1 * | 5/2012 | Tamura et al. .................. 385/92 |
| 2012/0183264 | A1 | 7/2012 | Shimotsu et al. |
| 2012/0243833 | A1 | 9/2012 | Shimotsu et al. |

FOREIGN PATENT DOCUMENTS

| | | |
|---|---|---|
| JP | 1983-032131 | 9/1984 |
| JP | 1997-248494 | 3/1999 |
| JP | 2001-188920 | 1/2003 |
| JP | 2004-009412 | 7/2005 |
| JP | 2005-103421 | 10/2006 |
| JP | 2005-104922 | 10/2006 |
| JP | 2006-284821 A | 10/2006 |
| JP | 4730274 | 4/2008 |
| JP | 2007-116451 | 11/2008 |
| JP | 2009-086227 A | 4/2009 |
| JP | 2009-086256 A | 4/2009 |
| JP | 2009-086258 | 4/2009 |
| JP | 2002-155037 | 5/2013 |
| WO | WO 2009/045366 A1 | 4/2009 |

OTHER PUBLICATIONS

International Search Report for PCT/US2010/041775, Oct. 12, 2010.

* cited by examiner

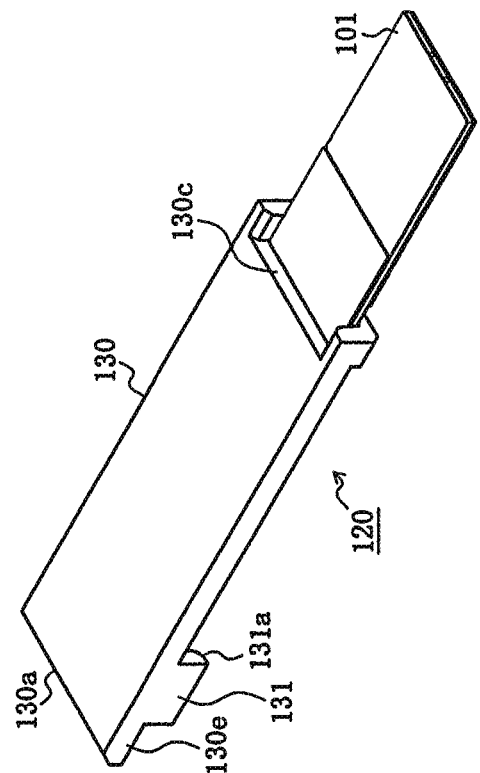
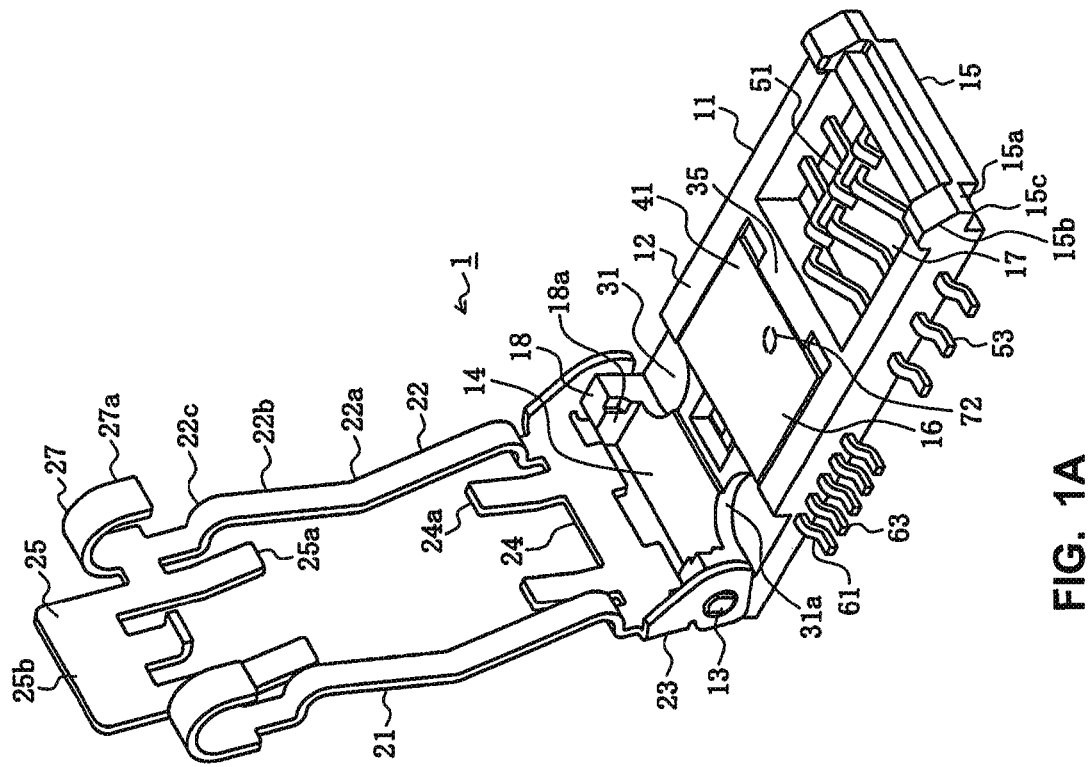
FIG. 1B
FIG. 1A

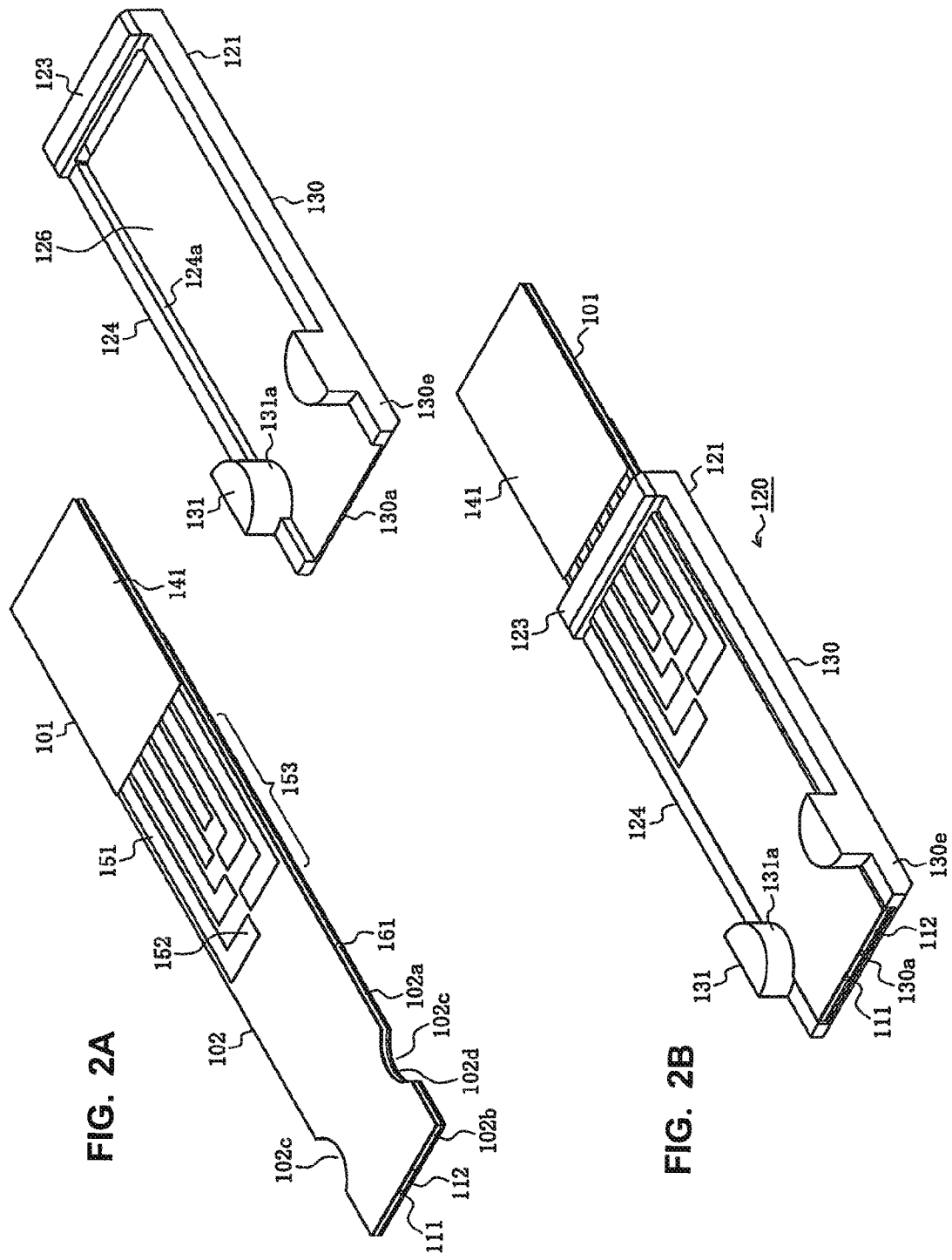

OPTICAL CONNECTOR FOR A CARD INCLUDING CONCAVE AND CONVEX GUIDE PORTIONS

REFERENCE TO RELATED APPLICATIONS

The Present Application claims priority to prior-filed Japanese Patent Application No. 2009-164637, entitled "Optical Connector," and filed 13 Jul. 2009, the contents of which is fully incorporated in its entirety herein.

BACKGROUND OF THE PRESENT APPLICATION

The Present Application relates generally to an optical connector, and, more particularly, to an optical connector using the same guide member for achieving positioning of an optical waveguide and a plug housing as well as for achieving positioning of a plug and a connector.

In an electronic device or apparatus such as a personal computer, a cellular phone, a personal digital assistant (PDA), a digital camera, a video camera, a music player, a game machine or a car navigation device, in order to realize both a decrease in an overall size a casing thereof and an increase in the size of a display screen thereof, the casing may be configured to be collapsible. In such a case, a flexible printed circuit (FPC), and conductive wires such as a fine coaxial cable, may be arranged to pass through an inside of a hinge portion that allows a casing to be pivotably connected with another casing so that signals can be transmitted parallelly.

Although a signal transmission speed is requested to increase in response to an increase in image resolution, since there is a limit in increasing the inside dimension of the hinge portion, it is practically impossible to arrange a conductive wire having a large width or diameter thereof. In addition, when a countermeasure against electro magnetic interference (EMI) is taken, the conductive wire will become larger in the width or diameter thereof.

In this regard, a method of optical transmission has been alternatively studied which is capable of transmitting a large amount of signals through serial transmission and is an excellent EMI countermeasure. An example of this is described in Japanese Patent Application No. 11-84174.

FIG. 6 is a perspective view of a conventional optical connector. As shown in the drawing figure of FIG. 6, an optical element portion, generally designated by reference numeral 870, is configured to receive therein an optical module including a light emitting element, a light receiving element and the like, and is coupled to a connector housing 811 by means of a coupling member 841. The connector housing 811 is provided with a groove-shaped guide portion 814 configured to allow a non-illustrated plug connected to a front end of a non-illustrated optical fiber to be inserted therein and an engagement wall portion 818 configured to be engaged with a front end of the plug. In addition, a pair of guide projections 831 is formed on a wall surface of the engagement wall portion 818, and the guide projections 831 are engaged with a pair of engagement holes formed in the plug, so that the plug is placed in position after insertion thereof.

The optical connector is provided with a clamping member 821 which is rotatably attached to the connector housing 811. A front end of the clamping member 821 is rotatably mounted on a rotation shaft 813 configured to project from a side surface of the engagement wall portion 818. The clamping member 821 is provided with elongated plate-like arm parts 822 configured to extend rearward from the front end of the clamping member 821. Moreover, latching portions 827 are connected to rear ends of the arm parts 822 so as to be engaged with the rear end of the plug, and an operation portion 825 allowing an operator to operate is connected to the rear ends of the latching portions 827.

When the plug is connected to the optical connector, the clamping member 821 is rotated from an altitude shown in the drawing figure of FIG. 6 to raise the operation portion 825, so that an upper surface of the guide portion 814 is open. Subsequently, the plug is inserted into the guide portion 814 from a rear side thereof, so that a front end surface of the plug comes into tight contact with the wall surface of engagement wall portion 818. In this case, the positioning of the plug is carried out by tightly fitting the guide projections 831 to be engaged with the engagement holes of the plug. Finally, when the clamping member 821 is rotated to lower the operation portion 825, the optical connector returns to assume the altitude shown in the drawing figure of FIG. 6. Owing to this configuration, the latching portions 827 are engaged with the rear end of the plug, and the plug is locked in a state of being connected to the optical connector.

However, according to the conventional optical connector, since the positioning of the plug is carried out by tightly fitting the guide projections 831 to be engaged with the engagement holes of the plug, it may be difficult for an operator to perform a connecting operation. Usually, when a plug connected to an optical fiber is connected to an optical connector, the guide projections 831 and the engagement holes are designed to have an extremely small dimensional tolerance since the positioning of a plug-side optical path relative to an optical connector-side optical path requires an extremely high degree of precision. For this reason, an operation of an operator moving the plug to cause the guide projections 831 to be inserted into the engagement holes requires a high degree of accuracy and is thus difficult to perform.

Moreover, when an unnecessarily large force is applied to the guide portion, the guide projections 831 might be broken. In recent years, with the advance in the miniaturization of the optical connector, the guide projections 831 have become miniaturized. For this reason, when an operator changes the altitude or the direction of the plug with the operator's fingers or the like, for example, when the guide projections 831 are being engaged with the engagement holes of the plug, the guide projections 831 might be broken by a force applied by the operator's fingers or the like.

Furthermore, since various errors, such as, for example dimensional errors of the guide projections 831 per se, errors in attachment of the guide projections 831 to the engagement wall portion 818, and dimensional errors of the engagement holes of the plug are accumulated, it is difficult to secure highly precise adjustments between a plug-side optical path and a optical connector-side optical path.

SUMMARY OF THE PRESENT APPLICATION

Therefore, it is an object of the Present Application to obviate the above-described problems encountered by the conventional optical connector and to provide an optical connector having such a configuration that the same guide member for achieving positioning of an optical waveguide and a plug housing is also used for achieving positioning of a plug and a connector. As a result, cumulative errors are reduced, and positioning of the optical waveguide relative to a connector housing can be achieved in an accurate and easy manner. Accordingly, the optical connector can be produced to have a small size and a simple structure at a low cost with high durability and good operability.

Therefore, an optical connector according to the Present Application includes a cable having formed therein an optical waveguide; a plug having the cable connected thereto; and a connector housing configured to mount thereon the plug, wherein: the cable is provided with a cable-side guide portion; the plug is provided with a plug housing which has a plug-side guide portion and is attached to the cable; the connector housing is provided with a connector-side guide portion; and, the plug-side guide portion is configured to be engaged with the cable-side guide portion to achieve a positioning of the cable and the plug housing and be engaged with the connector-side guide portion to achieve a positioning of the connector housing and the plug.

The optical connector according to another embodiment of the Present Application has such a configuration that the plug-side guide portion is a plurality of convex portions which is configured to protrude outwardly from the plug housing; the cable-side guide portion is a plurality of concave portions which is formed in the cable so that a corresponding one of the convex portions is inserted into each of the concave portions; and, the connector-side guide portion is a plurality of concave portions which is formed in the connector housing so that a corresponding one of the convex portions is inserted into each of the concave portions.

The optical connector according to a further embodiment of the Present Application has such a configuration that each of the concave portions includes circular arc-shaped side faces; and, each of the convex portions is a columnar member having circular arc-shaped side faces.

The optical connector according to a still further embodiment of the Present Application has such a configuration that the optical connector further includes a lock member which is attached to the connector housing in an altitude-changeable state and configured to be capable of locking the plug. When the lock member is being maintained at an open position thereof, the plug is mounted on the connector housing so that the cable-side guide portion is engaged with the connector-side guide portion. Meanwhile, when the lock member is brought to a closed position thereof, the plug is locked at the connector housing thereby establishing a connection to the cable.

The optical connector according to a still further embodiment of the Present Application has such a configuration that the plug housing is provided with a frame-shaped plug housing body and a plate-shaped plug top plate; and, the plug housing body has a pair of side wall portions and a rear crossbar portion configured to connect rear ends of the side wall portions with each other.

The optical connector according to a still further embodiment of the Present Application has such a configuration that the cable is a hybrid cable having laminated therein an optical waveguide and conductive wires; the plug is provided with a plug-side optical connection portion and a plug-side electric connection portion; the connector housing is provided with an optical connection portion and an electric connection portion; and, when the plug is mounted on the connector housing, the plug-side optical connection portion and the plug-side electric connection portion oppose the optical connection portion and the electric connection portion, respectively.

The optical connector according to a still further embodiment of the Present Application has such a configuration that the plug-side guide portion is configured to upstand from the plug-side optical connection portion.

In accordance with the Present Application, the optical connector has a configuration in which the same guide member for achieving positioning of the optical waveguide and the plug housing is also used for achieving positioning of the plug and the connector. Due to such a configuration, cumulative errors are reduced, and positioning of the optical waveguide relative to the connector housing can be achieved in an accurate and easy manner. Accordingly, it is possible to provide an optical connector which can be produced to have a small size and a simple structure at a low cost with high durability and good operability.

BRIEF DESCRIPTION OF THE FIGURES

The organization and manner of the structure and operation of the Present Application, together with further objects and advantages thereof, may best be understood by reference to the following Detailed Description, taken in connection with the accompanying Figures, wherein like reference numerals identify like elements, and in which:

FIGS. 1A and 1B are views of an optical connector according to an embodiment of the Present Application, illustrating a state where a lock member is left open and a cable is maintained at its position prior to being connected, in which FIG. 1A is a perspective view of a receptacle connector, and FIG. 1B is a perspective view of a plug connector;

FIGS. 2A and 2B are perspective views of a plug according to the embodiment of the Present Application, in which FIG. 2A is an exploded view, and FIG. 2B is an assembled view;

FIGS. 3A and 3B are two planar views of the plug according to the embodiment of the Present Application, in which FIG. 3A is a bottom plan view, and FIG. 3B is a side view;

FIGS. 5A to 5C are views illustrating an operation of tightly fitting the plug to be engaged with the receptacle connector according to the embodiment of the Present Application, in which FIGS. 5A to 5C are perspective views illustrating a series of operations thereof.

DESCRIPTION OF THE PREFERRED EMBODIMENTS

Figures 3A, 3B:
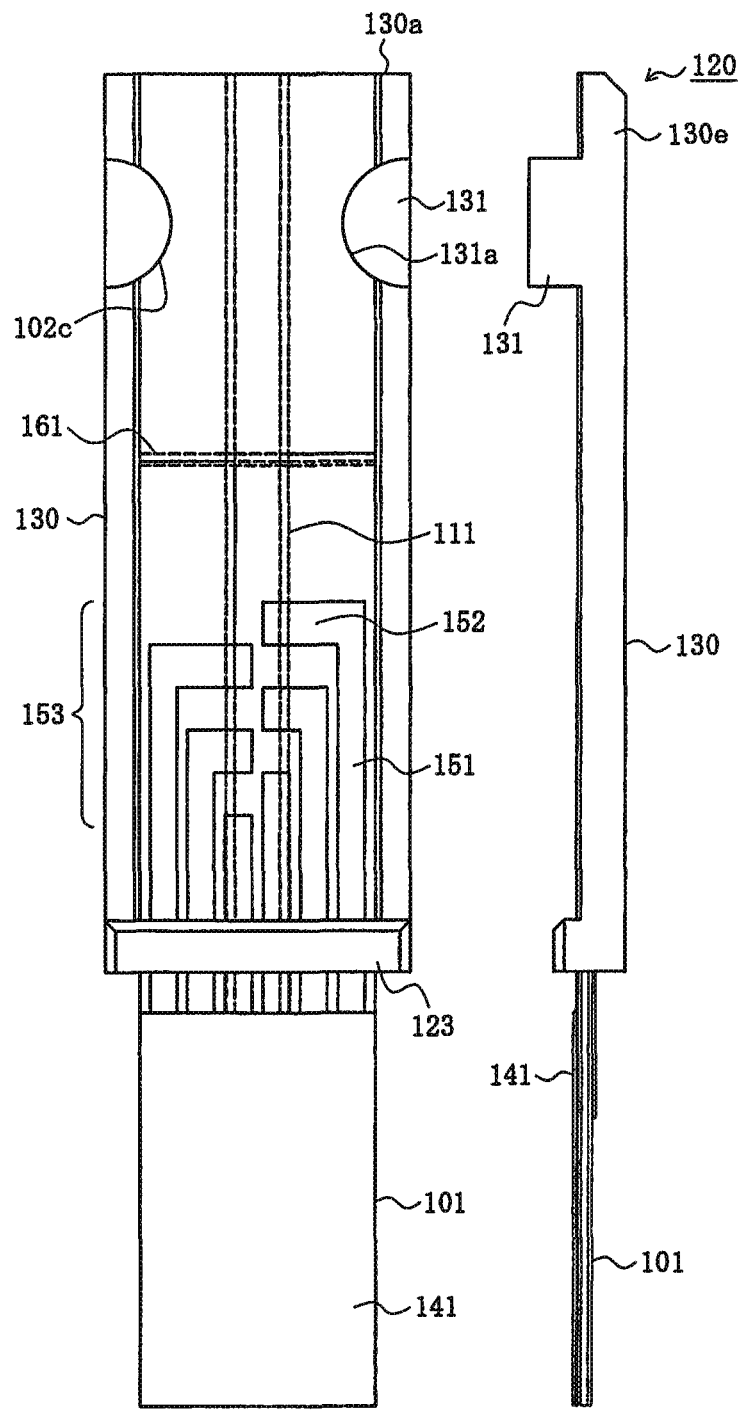

While the Present Application may be susceptible to embodiment in different forms, there is shown in the Figures, and will be described herein in detail, specific embodiments, with the understanding that the disclosure is to be considered an exemplification of the principles of the Present Application, and is not intended to limit the Present Application to that as illustrated.

In the illustrated embodiments, directional representations—i.e., up, down, left, right, front, rear and the like, used for explaining the structure and movement of the various elements of the Present Application, are relative. These representations are appropriate when the elements are in the position shown in the Figures. If the description of the position of the elements changes, however, it is assumed that these representations are to be changed accordingly.

In FIGS. 1A and 1B, a receptacle connector as one of a pair of optical connectors according to the present embodiment, generally designated by reference numeral 1, is a board-side connector which is mounted on a surface of a non-illustrated board such as a circuit board and constitutes a part of an optical connector for establishing a connection to a cable 101.

In this specification, the cable 101 is a combined cable having integrated therewith an optical waveguide and later-described conductive wires 151. Specifically, the cable 101 is one in which a flexible flat plate-like cable such as a flexible printed circuit is laminated, by bonding, onto one surface of a strip-like optical waveguide to form an integrated body, or one in which a conductive pattern is formed on one surface of a strip-like optical waveguide.

In addition, a plug housing 130 is attached to an end portion of the cable 101, and a plug 120 as a plug connector which is a counterpart optical connector of an optical connector assembly is formed in the end portion. Moreover, the plug 120 is engaged, by fitting, with the receptacle connector 1, whereby the cable 101 is connected to the receptacle connector 1.

Moreover, the optical connector according to the Present Application functions as a connector for connecting thereto an optical waveguide. Therefore, it is to be noted that the optical connector does not need to be a combined cable having integrated therewith an optical waveguide and conductive wires 151 as long as it is capable of connecting cables having at least an optical waveguide. However, in the present embodiment, for the sake of explanation, the optical connector will be described as being comprised of a connector capable of connecting thereto a cable 101 which is a combined cable having integrated therewith an optical waveguide and the conductive wires 151.

Although the purpose of use of the cable 101 is not particularly limited, it is suitably used, for example, in a personal computer, a cellular phone, a PDA, a digital camera, a video camera, a music player, a game machine, or a car navigation device. Specifically, it is particularly useful in an electronic device or apparatus in which a casing is divided into a plurality of parts, and neighboring ones of the division parts are rotatably connected with each other, so that the cable is wired so as to pass through an inside of a hinge portion that rotatably connects the neighboring division parts. Moreover, the cable 101 is capable of transmitting signals through serial transmission via the optical waveguide, for example, and is an excellent EMI countermeasure, and is thus suitably used for high-speed transmission of a large amount of signals. Furthermore, the receptacle connector 1 is suitably used for being mounted on a surface of a board arranged within a casing of the electronic device or apparatus.

The receptacle connector 1 is provided with a connector housing 11 that is integrally formed of an insulating material such as synthetic resin and a lock member 21 as an elastic lock member, that is integrally formed of an elastically deformable material such metal or synthetic resin and is attached to the connector housing 11 in an altitude-changeable state. The lock member 21 may be formed by applying processing, e.g., bending and pressing, to a metal plate. Moreover, the lock member 21 is capable of changing its altitude by having a proximal end thereof (the lower end in FIG. 1A) being rotatably connected to a distal end (the upper left end in FIG. 1A) of the connector housing 11, so that it is rotated between an open position as a first position, as illustrated in FIG. 1A, for mounting the plug 120 onto the connector housing 11 and a closed position as a later-described second position for locking the plug 120.

The lock member 21 is an approximately rectangular, hollow plate-like member and includes a strip plate-like first crossbar portion 24 and a second crossbar portion 25 configured to extend in a short-axis direction (width direction) and a pair of elongated strip plate-like flexible portions 22, configured to extend in a long-axis direction (vertical direction) so that both ends of the first crossbar portion 24 and the second crossbar portion 25 are connected with each other. The flexible portions 22 function as an extendable/contractible portion.

The first crossbar portion 24 is disposed at a distal end of the lock member 21, and proximal ends of a pair of mounting leg parts 23 as an attachment portion are connected to both ends thereof in the short-axis direction. Each of the mounting leg part 23 extends in a direction approximately perpendicular to the first crossbar portion 24 so that a distal end thereof is rotatably connected to a distal end of the connector housing 11 via a rotation shaft 13 of the connector housing 11. In other words, the mounting leg parts 23 can be said to be connected to one ends of the flexible portions 22 via the first crossbar portion 24. Furthermore, proximal ends of first pressing portions 24a as a plug pressing portion configured to extend toward the second crossbar portion 25 are connected between portions of the first crossbar portion 24 connected to the pair of flexible portions 22.

The second crossbar portion 25 is disposed at a rear end of the lock member 21, and proximal ends of a pair of latching arm parts 27 as a latched portion are connected to both ends on the rear end side in the long-axis direction. Each of the latching arm parts 27 has a generally U shape in side view and extends in a direction away from the first crossbar portion 24 to be downwardly bent so that a distal end portion 27a thereof is directed toward the first crossbar portion 24 to be engaged with or disengaged from the connector housing 11. In other words, the latching arm parts 27 can be said to be connected to one ends of the flexible portions 22 via the second crossbar portion 25. Moreover, at the closed position, the distal end portions 27a are latched to lock projections 15a as a latching portion of the connector housing 11. Furthermore, proximal ends of second pressing portions 25a as a plug pressing portion configured to extend toward the first crossbar portion 24 are connected between portions of the second crossbar portion 25 connected to the pair of flexible portions 22.

In addition, a proximal end of a plate-like operation portion 25b extending in a direction away from the first crossbar portion 24 is connected to a portion of the second crossbar portion 25 disposed inner than the portions thereof connected to the latching arm parts 27. Although the operation portion 25b is a portion operated by an operator's fingers or the like when an altitude of the lock member 21 is to be changed, the operation portion 25b may be appropriately omitted if not necessary.

Moreover, each of the flexible portions 22 has a generally dog-leg shape in side view and is provided with a bent portion 22a that is bent so as to upwardly project at the closed position, flat plate-like or straight-line shaped straight portions 22b connected to both sides of the bent portion 22a, and connection portions 22c connecting both ends of the bent portion 22 to the first crossbar portion 24 and the second crossbar portion 25. Since the flexible portions 22 have such a lateral shape and are formed of an elastic material, they are capable of being elastically expanded or contracted. That is, since a distance between both ends of the flexible portion 22 can be increased, it is possible to increase a distance between the first crossbar portion 24 and the second crossbar portion 25. Specifically, when the bent portion 22a is downwardly pressed at the closed position, the degree of bending of the bent portion 22a is decreased and thus an angle between the straight portions 22b at both sides thereof is increased, and as a result, the distance between both ends of the flexible portion 22 is increased. That is, the flexible portion 22 is expanded or contracted in accordance with a change in the degree of bending of the bent portion 22a.

The connector housing 11 is a plate-like member having a generally rectangular shape in top plan view and is provided with a pair of sidewall portions 12 extending in the long-axis direction and a rear-end wall portion 15 extending in the width direction at a rear end thereof so as to connect the sidewall portions 12 at both sides thereof. The connector housing 11 is further provided with a guide portion 14, an optical connection portion 16, and an electric connection portion 17 being arranged in tandem in the long-axis direction from a distal end thereof toward the rear end. The rotation shaft 13 is attached on the both sides of the guide portion 14, and the mounting leg parts 23 of the lock member 21 are rotatably attached to the rotation shaft 13.

The opposite sidewall portions 12 are connected with each other, at a middle thereof, by a partition wall portion 35 extending in the width direction so as to partition the optical connection portion 16 and the electric connection portion 17.

Moreover, in the vicinity of both ends in the width direction of the rear-end wall portion 15, that is, in rear end surfaces of the opposite sidewall portions 12, lock projections 15a as a latching portion projected rearward are formed. When the lock member 21 is position at the closed position, the distal end portions 27a of the latching arm parts 27 are engaged with the lock projections 15a so that the lock member 21 is latched to the connector housing 11. As a result, the plug 120 is locked. Moreover, since the upper surfaces of the lock projections 15a are configured as tapered surfaces 15b that are downwardly sloped toward a rear side so that the distal end portions 27a can be easily slid on the upper surfaces. Furthermore, concave portions on the lower surface sides of the lock projections 15a are configured as concave latching portions 15c so that the distal end portions 27a can be firmly latched. The lock projections 15a may be formed on side surfaces of the opposite sidewall portions 12.

The guide portion 14 is provided with a flat upper surface used as a guide surface, side face-abutting portions 18 used as plug mounting-guide portions, which are configured to protrude upwardly from the upper surface, and concave guide portions 31 which are concave portions formed so as to be depressed downward from the upper surface and function as a positioning guide portion.

The side face-abutting portions 18 are a pair of columnar members which are formed to be integral with and upstand from both left and right ends of the guide portion 14. The side face-abutting portions 18 have opposing inner side faces 18a thereof which are flat surfaces and are configured to be extended in the longitudinal direction. The side face-abutting portions 18 guide side face portions 130e which are disposed in the vicinity of the front end of the plug housing 130. That is to say, the side face-abutting portions 18 exhibit a function of guiding the side face portions 130e which are disposed in the vicinity of a front end portion 130a of the plug housing 130 when the plug 120 is mounted on the connector housing 11. Moreover, the rotation shaft 13 is specifically attached to the side face-abutting portions 18.

Moreover, the concave guide portions 31 are concave portions which are formed to be adjacent to the rear ends of the left and right side face-abutting portions 18 so as to be extended from the guide portion 14 to the side wall portions 12. Specifically, the concave guide portions 31 are shallow and wide groove-shaped concave portions which extend from side faces of the left and right side wall portions 12 towards the center in the width direction of the receptacle connector 1, and are open to the side faces of the side wall portions 12 and closed to the center in the width direction. Furthermore, the concave guide portions 31 are connector-side guide portions and are configured to be engaged with columnar convex guide portions 131 of the plug housing 130, thereby functioning as a positioning guide portion for achieving positioning of the plug 120 relative to the receptacle connector 1. For this purpose, at least a portion of each of the side walls 31a of the groove-shaped concave guide portions 31, corresponding to the innermost portion of the closed groove has a cylindrical inner side face shape which corresponds to a semi-circular columnar shape of the side walls 131a of the convex guide portions 131. That is to say, the concave guide portions 31 have a semi-circular shape in a top plan view thereof and a circular arc shape in a side view thereof.

The top view shape of portions of the side walls 31a corresponding to the innermost portion of the groove is not necessarily the semi-circular shape, but may be any shape as long as it has such a shape as to be engaged with the side walls 131a of the convex guide portions 131. For example, the top view shape may be a triangular shape or generally a V shape that includes two oblique side portions being inclined in mutually opposite directions to the longitudinal direction of the groove-shaped concave guide portions 31.

On the other hand, the convex guide portions 131 are formed to be integral with a portion of the lower surface of the plug housing 130 of the plug 120, disposed in the vicinity of the front end portion 130a. The convex guide portions 131 function as positioning guide portions which are configured to be engaged with the concave guide portions 31 to achieve positioning of the plug 120 relative to the receptacle connector 1. The convex guide portions 131 are convex portions that protrude downwardly from both lateral ends of the plug housing 130 and function as a plug-side guide portion. Moreover, the outer side walls of the left and right convex guide portions 131 are flat surfaces being even with the side face portions 130e, and the inner side walls 131a of the left and right convex guide portions 131 are circular column-shaped side faces. That is to say, the convex guide portions 131 are semi-circular columnar members and have a semi-circular shape from a top plan view thereof and a circular arc shape from a side view thereof.

The top view shape of the convex guide portions 131 is not necessarily the semi-circular shape, but may be any shape as long as it has such a shape as to be inserted into and engaged with the concave guide portions 31 to achieve positioning of the plug 120 relative to the receptacle connector 1. For example, the top view shape may be a trapezoidal or triangular shape.

When the convex guide portions 131 of the plug housing 130 are engaged with the concave guide portions 31 of the connector housing 11, the plug 120 mounted on the connector housing 11 can be guided to a predetermined position with high precision. Hence, the positioning of the plug 120 relative to the receptacle connector 1 can be achieved with high precision.

Moreover, at this time, the front end portion 130a and neighboring portions thereof in side face portions 130e of the plug housing 130 are guided to inner side faces 18a of the side face-abutting portions 18, whereby the rough positioning in the width direction of the connector housing 11 and the plug 120 can be carried out in an easy manner. That is, by moving the front end portion 130a of the plug housing 130 and the neighboring portions thereof to be positioned between the side face-abutting portions 18 on both sides thereof, the brief positioning between the connector housing 11 and the plug 120 can be achieved. In this way, the positioning between the connector housing 11 and the plug 120 can be carried out in an easy manner with high precision by the engagement between the concave guide portions 31 and the convex guide portions 131.

Furthermore, the plug 120 is a thin plate-like member having an approximately rectangular shape in top plan view, and when the plug 120 is mounted on the connector housing 11, a lower surface thereof opposes an upper surface of the connector housing 11.

In addition, the optical connection portion 16 is a portion that performs transferring of light to the optical waveguide of the cable 101 and is configured as a concave portion capable of receiving therein an optical device such as a control IC or the like as a light receiving/emitting control device (not shown) which is provided with an optical semiconductor device 72, e.g., a light receiving element and a light emitting element, and a control circuit for controlling the optical semiconductor device 72. In the example illustrated in the drawing figures, an upper surface of the concave portion is sealed by a thin plate-like sealing plate 41 which is formed of a translucent material such as glass.

Moreover, the optical connection portion 16 receives therein optical terminals 61 which are formed of a conductive material such as metal and connected to the optical semiconductor device 72 or the control IC. The optical terminals 61 are provided with tail portions 63 as board connection portions, which are connected, by soldering or the like, to connection pads formed on a surface of a board, and the tail portions 63 are projected outward from the lateral surfaces of the connector housing 11.

Furthermore, the electric connection portion 17 is a portion which is electrically connected to the conductive wires 151 of the cable 101, and is configured as a concave portion which is capable of receiving therein electric connection terminals 51 formed of a conductive material such as metal. The electric connection terminals 51 are provided with contact portions that are formed in the vicinity of free ends thereof and are curved so as to be convex toward the upper side and tail portions 53 as a board connection portion connected, by soldering or the like, to connection pads formed on a surface of a board, so that the tail portions 53 are projected outward from the lateral surfaces of the connector housing 11.

Next, a detailed description of the structure of the plug 120 will be provided below.

Although the cable 101 is a thin plate member having an elongated strip shape, only a portion in the vicinity of a front end thereof (the lower left end in FIG. 2) is illustrated in FIGS. 2 and 3. Moreover, a connection end portion as a plug connection portion, designated by reference numeral 102, is formed within a range of a predetermined length from a front end surface 102b thereof.

On the lower surface of the cable 101, a plurality of lines, e.g., six lines of foil-like conductive wires 151 formed of a conductive material such as metal is arranged in parallel with one another at a predetermined pitch on a first insulating layer 141 of the cable 101. Furthermore, the first insulating layer 141 is removed in the connection end portion 102 so that the lower surface of the conductive wires 151 is exposed.

In addition, connection pad portions 152 having a large width are formed at distal ends of the respective conductive wires 151. The respective connection pad portions 152 are formed at positions corresponding to the contact portions of the electric connection terminals 51 received in the electric connection portion 17 of the connector housing 11 in a state where the cable 101 is connected to the receptacle connector 1. Moreover, a portion within the range, where the connection pad portions 152 are arranged, functions as a plug-side electric connection portion 153. Although the connection pad portions 152 may be arranged in an arbitrary form, it is preferable that they are arranged in a zigzag form, and arranged in tandem in an axial direction of the cable 101, as illustrated in the drawing figures. Owing to this configuration, it is possible to arrange a number of connection pad portions 152 without needing to increase the width of the connection end portion 102, and as a result, it is possible to suppress any increase in the width dimension of the plug 120. When the conductive wires 151 have a sufficiently large width, it is not necessary to form large-width connection pad portions 152, but it is possible to allow distal ends of the conductive wires 151 to function per se as the connection pad portions 152.

Moreover, a plug-side optical connection portion is formed in a portion of the connection end portion 102 disposed closer to the front end thereof than the connection pad portions 152, the plug-side optical connection portion has formed therein an optical path conversion portion 161. The optical path conversion portion 161 is provided with a later-described slope surface 162 functioning as a mirror surface and is capable of changing a direction of light transmitted from the optical waveguide to about a right angle. That is, the optical path conversion portion 161 changes an optical path extending in an axial direction of the cable 101 to an optical path extending in a direction perpendicular to the lower surface of the cable 101. Owing to this configuration, light transmitted through the optical waveguide can be emitted toward the lower side from the lower surface of the cable 101, and light incident onto the lower surface of the cable 101 from the lower side can be introduced to the optical waveguide. The optical path conversion portion 161 is formed at a position corresponding to the optical semiconductor device 72 received in the optical connection portion 16 of the connector housing 11 in a state where the cable 101 is connected to the receptacle connector 1.

The plug housing 130 includes a plug housing body 121 configured as a rectangular frame-like member extending in an axial direction of the cable 101 and a plug top plate 126 configured as a rectangular plate-like member extending in the axial direction of the cable 101. The plug housing body 121 is a member integrally formed with the top plate 126 of an insulating material such as synthetic resin and is provided with a pair of sidewall portions 124 extending in the long-axis direction, and a rear crossbar portion 123 configured to connect rear ends of the sidewall portions 124 with each other.

The dimension in the thickness direction of the sidewall portions 124 is identical to a dimension in the thickness direction of the connection end portion 102 of the cable 101. Moreover, the sidewall portions 124 determine the position in the width direction of the cable 101.

The convex guide portions 131 are formed to be integral with a portion of the plug housing 130 disposed in the vicinity of the front end portion 130a, thereby functioning as a positioning guide portion for achieving positioning of the optical waveguide relative to the plug housing 130. The convex guide portions 131 are convex portions which protrude downwardly from both lateral ends and the side wall portions 124 of the plug top plate 126 and are configured as semi-circular column-shaped convex portions as described above. Moreover, as described above, the outer side walls of the left and right convex guide portions 131 are flat surfaces being even with the side face portions 130e, and the inner side walls 131a of the left and right convex guide portions 131 are circular column-shaped side faces.

Moreover, cable-side laterally concave portions 102c are formed in portions of the connection end portion 102 of the cable 101 disposed in the vicinity of the front end face 102b so as to be recessed from both side faces 102a toward the center in the width direction of the cable 101.

The cable-side laterally concave portions 102c are concave portions which are formed by excising a portion of the flat plate-like cable 101, and in which portions thereof close to the side faces 102a are open and portions thereof close to the center in the width direction of the cable 101 are closed. Moreover, the cable-side laterally concave portions 102c are cable-side guide portions and are configured to be engaged with the convex guide portions 131 of the plug housing 130, thereby functioning as a positioning guide portion for achieving positioning of the cable 101 relative to the plug housing 130. For this purpose, at least a portion of each of the side walls 102d of the cable-side laterally concave portions 102c, corresponding to the closed innermost portion has a cylindrical inner side face shape which corresponds to a semi-circular columnar shape of the side walls 131a of the convex guide portions 131. That is to say, the cable-side laterally concave portions 102c have a semi-circular shape from a top plan view thereof and a circular arc shape from a side view thereof.

The top view shape of portions of the side walls 102d of the cable-side laterally concave portions 102c corresponding to the innermost portion is not necessarily the semi-circular shape, but may be any shape as long as it has such a shape as to be engaged with the side walls 131a of the convex guide portions 131. For example, the top view shape may be a triangular shape or generally a V shape that includes two oblique side portions being inclined in mutually opposite directions to the longitudinal direction of the groove-shaped concave guide portions 31.

Moreover, when the convex guide portions 131 are inserted into and engaged with the cable-side laterally concave portions 102c, the positioning in the width direction of the connection end portion 102 of the cable 101 relative to the plug housing 130 and the positioning in the longitudinal direction (axial direction) of the cable 101 relative to the plug housing 130 are achieved.

Furthermore, the front end portion 130a of the plug housing 130 is not formed with any wall that makes abutting or close contact with the front end face 102b of the cable 101, but is only formed by the plug housing body 121 and the plug top plate 126. Due to such a configuration, when the cable 101 is mounted on the plug housing 130, the longitudinal length of the connection end portion 102 of the cable 101 or the cross-sectional shape of the front end face 102b will not affect the precision of the operation of achieving the positioning of the cable 101 relative to the plug housing 130. In addition, since it is not necessary to increase the precision of the longitudinal length of the connection end portion 102 of the cable 101 or the cross-sectional shape of the front end face 102b, it is possible to decrease an overall production cost.

The rear crossbar portion 123 is a rectangular plate-like member having a rectangular sectional shape and is provided with a flat upper surface, being configured such that an upper surface thereof is brought into tight contact with the lower surface of the connection end portion 102 of the cable 101, so that the cable 101 is supported from the lower side. The rear crossbar portion 123 is connected to the sidewall portions 124 so that the upper surface thereof is at the same surface as the lower surface of the sidewall portions 124. Therefore, the rear end surface of the plug housing body 121 has an approximately U shape as viewed from a rear side thereof.

In addition, the length of the plug top plate 126, that is, a dimension thereof in the long-axis direction, is substantially the same as a dimension from the front end portion 130a of the plug housing 130 to the front end surface of the rear crossbar portion 123. Moreover, the width of the plug top plate 126, that is, a dimension thereof in the short-axis direction, is substantially the same as a dimension of the plug housing body 121 as measured from an inner surface 124a of one of the sidewall portions 124 to an inner surface 124a of the other of the sidewall portions 124.

In the present embodiment, the cable 101 has an optical waveguide and conductive wires 151 laminated on the optical waveguide. The optical waveguide is provided with a core portion 111 serving as a light transmission path which extends in the axial direction of the cable 101 to transmit light therethrough and a plate-shaped clad portion 112 which is configured to surround the core portion 111. In the example illustrated in the drawing figure, although the number of core portions 111 is two, the number may be one or may be three or more and may be set arbitrarily.

Moreover, although a transmission mode of the optical waveguide may be any one of a single mode and a multi mode, in this example, it will be described as being a single mode. Furthermore, a refractive index of the clad portion 112 is preferably set to a value lower than a refractive index of the core portion 111. Furthermore, the core portion 111 and the clad portion 112 may be formed of any kinds of materials as long as they can satisfy the above-mentioned refractive index requirements. For example, the core portion 111 and the clad portion 112 may be formed of a silicon substrate, a glass substrate, or a flexible resin film. In this specification, a description of an example where the core portion 111 and the clad portion 112 are formed of a flexible resin film will be provided.

The conductive wires 151 are conductive wires of a flexible circuit board, which is called FPC, for example, and are arranged on the lower surface (the upper surface in FIG. 2) of the optical waveguide in parallel with one another at a predetermined pitch so as to extend in the axial direction of the cable 101. Moreover, a first insulating layer 141 is arranged so as to cover the lower surface of the conductive wires 151. Furthermore, the first insulating layer 141 is removed in the connection end portion 102 so that a corresponding portion of the conductive wires 151 is exposed.

As described above, since the plug 120 is formed by having the plug housing 130 attached to the connection end portion 102 of the cable 101, the connection end portion 102 of the cable 101, which had flexibility and hence was difficult to handle, is made solid because of the plug housing 130 and hence becomes easy to handle. Therefore, it is possible to establish connection of the cable 101 to the receptacle connector 1 in an easy and accurate manner.

Next, a description of the connection relationship between a connection end portion 102 of the cable 101 and an optical connection portion 16 and an electric connection portion 17 of a receptacle connector 1 will be provided in detail.

Figure 4:
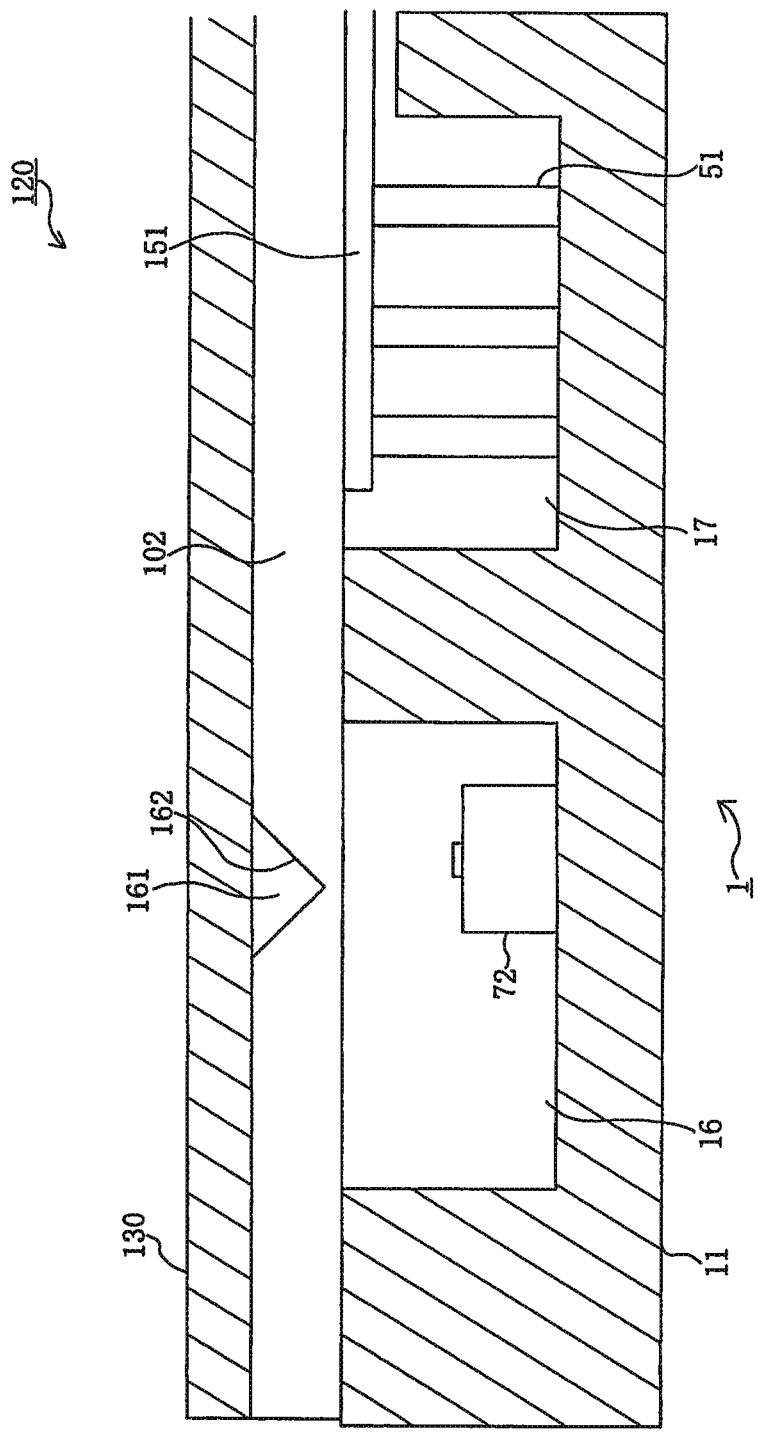
FIG. 4 is a schematic side sectional view illustrating the connection relationship between the connection end portion of a cable and an optical connection portion and an electric connection portion of a receptacle connector according to the embodiment of the Present Application.

Since the convex guide portions 131 of the plug housing 130 are engaged with the concave guide portions 31 of the abutting portion 18 of the connector housing 11 in a state where the plug 120 is connected to the receptacle connector 1, the position of the plug 120 relative to the connector housing 11 is fixed with respect to the axial direction and the width direction of the cable 101. Therefore, as will be understood from FIG. 4, in a state where the plug 120 is connected to the receptacle connector 1, the optical path conversion portion 161 of the plug 120 is disposed at a position right above the optical semiconductor device 72 received in the optical connection portion 16 of the receptacle connector 1. Moreover, with respect to the width direction of the cable 101, the optical path conversion portion 161 of the plug 120 is disposed at a position right above the optical semiconductor device 72. Owing to this configuration, the cable 101 and the receptacle connector 1 are optically connected with each other.

That is, light emitted from a light emitting surface of the optical semiconductor device 72 is incident onto the cable

101 from the lower side thereof, reflected from the slope surface 162 disposed close to the rear side of the optical path conversion portion 161, introduced to the core portion 111 corresponding to the light emitting element 72b while changing a traveling direction thereof to about a right angle, and transmitted through the core portion 111 along the axial direction of the cable 101. On the other hand, light transmitted through the core portion 111 along the axial direction of the cable 101 is reflected from the slope surface 162 disposed close to the rear side of the optical path conversion portion 161, emitted toward the lower side from the lower surface of the cable 101 while changing a traveling direction thereof to about a right angle, and received by a light receiving surface of the optical semiconductor device 72.

In addition, the plug-side electric connection portion 153 of the plug 120 is disposed at a position right above the electric connection portion 17 of the receptacle connector 1, and the respective connection pad portions 152 are brought into electrical contact with the contact portions of corresponding ones of the electric connection terminals 51 received in the electric connection portion 17.

In the present embodiment, as is obvious from FIG. 3A, the cable-side laterally concave portions 102c are formed at a further front side than the optical path conversion portion 161. This is because by arranging the cable-side laterally concave portions 102c at such a further front side rather than the optical path conversion portion 161, the formation of the cable-side laterally concave portions 102c will neither affect the light transmission through the optical waveguide nor affect the arrangement of the conductive wires 151 or the connection pad portions 152. However, as long as it does not affect the light transmission through the optical waveguide and the arrangement of the conductive wires 151 or the connection pad portions 152, the cable-side laterally concave portions 102c may be located at any position within the range of the connection end portion 102. For example, the cable-side laterally concave portions 102c may be located at the same position as the optical path conversion portion 161 in the longitudinal direction of the cable 101 and may be located at a further rear side rather than the optical path conversion portion 161. When the position of the cable-side laterally concave portions 102c is changed, the position of the convex guide portions 131 formed in the plug housing 130 and the position of the concave guide portions 31 formed in the connector housing 11 should be changed to comply with the change of the position.

Moreover, in the present embodiment, the convex guide portions 131, and the cable-side laterally concave portions 102c and the concave guide portions 31, which are engaged therewith, are provided two, respectively, and are arranged horizontally symmetrical with respect to the central axis of the cable 101. However, the convex guide portions 131, the cable-side laterally concave portions 102c, and the concave guide portions 31 may be provided in any number as long as they are plural, namely two or more, and they are not necessarily arranged horizontally symmetrically with respect to the central axis of the cable 101 but may be arranged horizontally asymmetrically. However, the respective convex guide portions 131, and the cable-side laterally concave portions 102c and the concave guide portions 31, which are engaged therewith, should be arranged at corresponding positions.

Next, a description of the operation of connecting the cable 101 to the receptacle connector 1 by tightly fitting the plug 120 to be engaged with the receptacle connector 1 will be provided below.

Figures 5A, 5B, 5C:
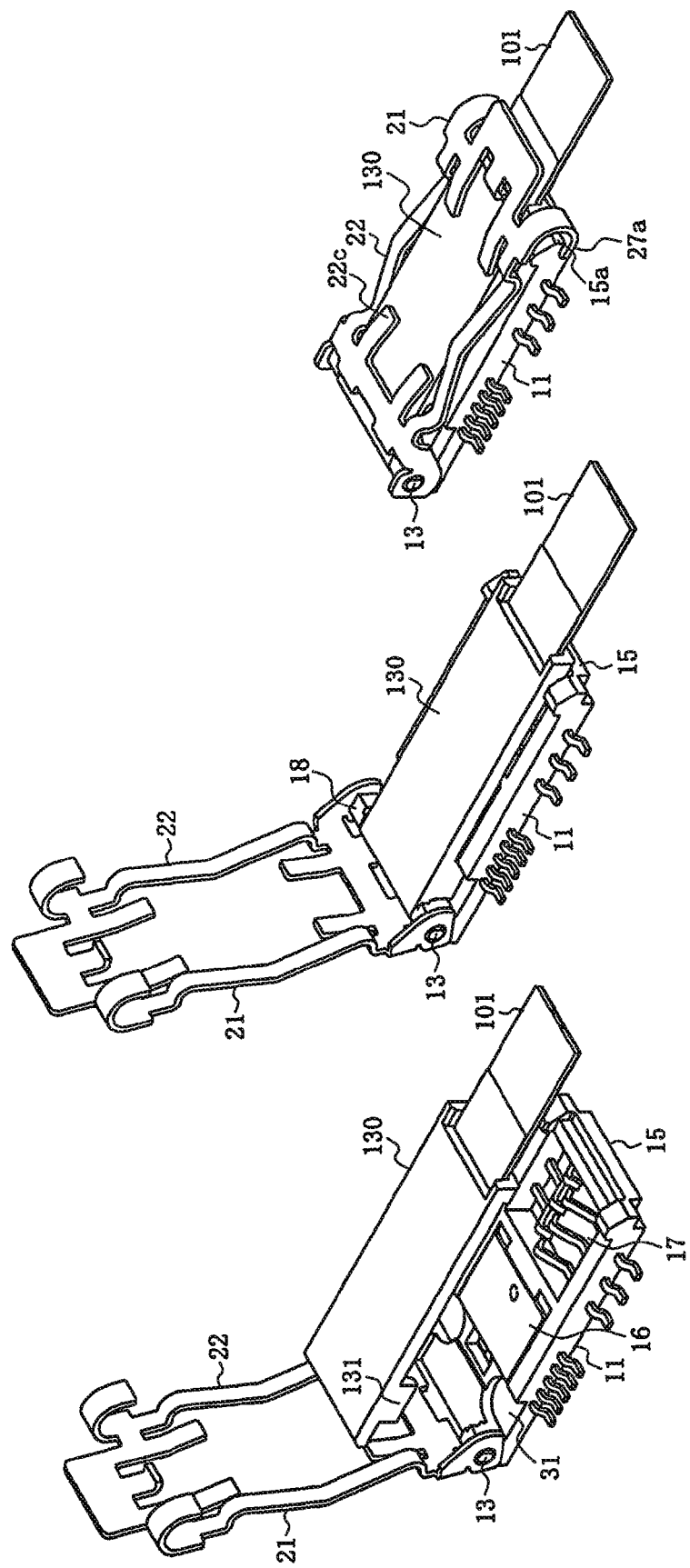
Figure 6:
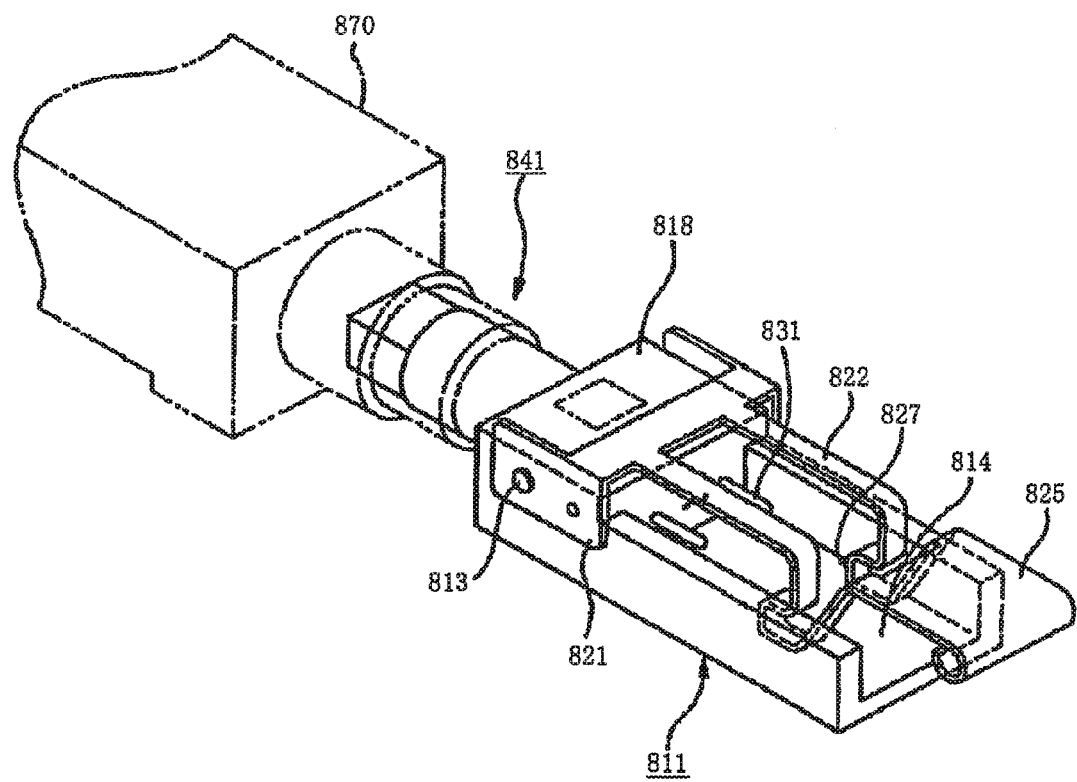
FIG. 6 is a perspective view of a conventional optical connector.

First, as illustrated in FIG. 5A, the lock member 21 of the receptacle connector 1 is moved to the open position so that the plug 120 is positioned above the connector housing 11. In this case, the lower surface of the plug 120, that is, the exposed surface of the connection pad portions 152 is positioned so as to oppose the upper surface of the connector housing 11. At the same time, the front end portion 130a of the plug housing 130 is positioned right above the guide portion 14 of the connector housing 11, and the rear crossbar portion 123 of the plug 120 is positioned at a rear upper side of the rear-end wall portion 15 of the connector housing 11.

Subsequently, the plug 120 is lowered relative to the connector housing 11 so as to be engaged, by fitting, with the connector housing 11. In this case, the plug 120 is lowered in such a state that a portion of the plug housing 130 disposed in the vicinity of the front end portion 130a is positioned between the left and right side face-abutting portions 18, and that the convex guide portions 131 oppose the corresponding concave guide portions 31. Moreover, when the plug 120 is mounted on the connector housing 11, a portion of the plug housing 130 disposed in the vicinity of the front end portion 130a is moved to be positioned between the left and right side face-abutting portions 18, and the convex guide portions 131 are inserted into the corresponding concave guide portions 31. With this operation, the convex guide portions 131 are engaged, by fitting, with the concave guide portions 31, and hence, as illustrated in FIG. 5B, the plug 120 is positioned relative to the connector housing 11.

Subsequently, the position of the lock member 21 is changed from the open position: specifically, the lock member 21 is rotated in the clockwise direction in the drawing figures about the rotation shaft 13, so that the lock member 21 reaches a position above the plug 120. When the lock member 21 is further rotated from this state, the distal end portions 27a of the latching arm parts 27 of the lock member 21 are brought into tight contact with the upper surfaces; that is, the tapered surfaces 15b of the lock projections 15a of the connector housing 11.

When the lock member 21 is further rotated by an operator's fingers or the like so that the latching arm parts 27 are moved downwardly, the distal end portions 27a are slid along the tapered surfaces 15b, and thus, the latching arm parts 27 are displaced in a direction away from the rotation shaft 13. Then, the bent portion 22a is elastically deformed and hence the flexible portion 22 having elastic properties is expanded. When the distal end portions 27a of the latching arm parts 27 of the lock member 21 are brought into tight contact with the apex portions of the lock projections 15a of the connector housing 11, the flexible portion 22 is in its most expanded state.

Moreover, when the lock member 21 is further rotated from the above-described state so that the latching arm parts 27 are further moved downwardly, the distal end portions 27a are separated from the apex portions of the lock projections 15a to be inserted into the concave latching portions 15c on the lower surface side of the lock projections 15a. Moreover, the bent portion 22a restores its original shape by a spring's restoring force so that the flexible portion 22 is contracted to restore its original shape. Furthermore, the distal end portions 27a are engaged with the lower surfaces of the lock projections 15a. In this way, the lock member 21 is latched to the connector housing 11 at the closed position as illustrated in FIG. 5C so that the plug 120 is locked.

In this manner, the plug 120 is locked by being tightly fitted with the receptacle connector 1, and thus, the cable 101 is firmly connected to the receptacle connector 1.

Furthermore, when the position of the plug 120 relative to the connector housing 11 is fixed, the optical path conversion portion 161, as the plug-side optical connection portion, and the plug-side electric connection portion 153 of the plug 120 are positioned so as to oppose the optical connection portion 16 and the electric connection portion 17 of the connector housing 11, respectively. In addition, the front end portion 130a of the plug housing 130 is engaged with the inner side faces 18a of the side face-abutting portions 18 of the connector housing 11. Furthermore, the rear crossbar portion 123 in the vicinity of the rear end of the plug 120 is engaged with the rear-end portion 15 of the connector housing 11. Therefore, the positional relationship between the plug 120 and the connector housing 11 can be stably maintained. Owing to these configurations, the positional relationship is not disturbed even upon receipt of an unexpected external force.

As illustrated in FIG. 5C, it is necessary to unlock the plug 120 in order to remove the plug 120 from engagement with the receptacle connector 1. In this case, the operator downwardly presses the bent portions 22a of the flexible portions 22 with the operator's fingers or the like. In this way, the bent portions 22a are elastically deformed, and the flexible portions 22 are expanded. As a result, the distal end portions 27a of the latching arm parts 27 are displaced in the direction away from the rotation shaft 13, and the distal end portions 27a are disengaged from the lower surfaces of the lock projections 15a. That is, the latched state between the distal end portions 27a of the latching arm parts 27 and the concave latching portions 15c is released.

In such a state, when the operator moves the operation portion 25b toward the upper side by the operator's fingers or the like, the lock member 21 is rotated in the counter-clockwise direction about the rotation shaft 13, so that the latching arm parts 27 are moved upward. With this operation, the plug 120 is unlocked.

As described above, the optical connector according to the present embodiment includes the cable 101 having formed therein the optical waveguide, the plug 120 having the cable 101 connected thereto, and the connector housing 11 configured to mount the plug 120 thereon. The cable 101 is provided with the cable-side laterally concave portions 102c. The plug 120 is provided with the plug housing 130 which has the convex guide portions 131 and is attached to the cable 101. The connector housing 11 is provided with the concave guide portions 31. The convex guide portions 131 are configured to be engaged with the cable-side laterally concave portions 102c to achieve the positioning of the cable 101 and the plug housing 130 and be engaged with the concave guide portions 31 to achieve the positioning of the connector housing 11 and the plug 120.

Due to such a configuration, the convex guide portions 131 which are used for achieving the positioning of the cable 101 and the plug housing 130 can also be used for achieving the positioning of the connector housing 11 and the plug 120. Therefore, it is possible to reduce cumulative errors which result from various errors, such as, for example, the dimensional errors of the guide member and the assembly errors of members such as the cable 101, the plug housing 130, or the connector housing 11. As a result, it is possible to improve the precision of the operation of achieving the positioning of the optical waveguide relative to the connector housing 11. Moreover, it is possible to achieve the positioning of the respective members in an easy manner, simplify the structure of the optical connector, reduce the production cost thereof, and facilitate the operability thereof.

Moreover, the convex guide portions 131 are a plurality of convex portions which is configured to protrude outward from the plug housing 130. The cable-side laterally concave portions 102c are a plurality of concave portions which is formed in the cable 101 so that the corresponding convex guide portions 131 are inserted into the cable-side laterally concave portions 102c. The concave guide portions 31 are a plurality of concave portions which is formed in the connector housing 11 so that the corresponding convex guide portions 131 are inserted into the concave guide portions 31. Due to such a configuration, the positioning of the cable 101 and the plug housing 130 and the positioning of the plug 120 and the connector housing 11 can be achieved in a highly precise and easy manner.

Furthermore, the cable-side laterally concave portions 102c and the concave guide portions 31 include semi-circular side faces thereof, and the convex guide portions 131 are semi-circular columnar members having semi-circular side faces. Due to such a configuration, the size of an area where the cable-side laterally concave portions 102c and the concave guide portions 31 interfere with the convex guide portions 131 can be decreased. Therefore, it is possible to decrease the stress applied to the cable-side laterally concave portions 102c, the concave guide portions 31, and the convex guide portions 131. Accordingly, it is possible to decrease the stress applied to the plug housing 130, the cable 101, and the connector housing 11.

Furthermore, the optical connector further includes the lock member 21 which is attached to the connector housing 11 in an altitude-changeable state and configured to be capable of locking the plug 120. When the lock member 21 is being maintained at its open position, the plug 120 is mounted on the connector housing 11 so that the convex guide portions 131 are engaged with the concave guide portions 31. When the lock member 21 is brought to its closed position, the plug 120 is locked at the connector housing 11 thereby establishing the connection to the cable 101. Due to such a configuration, it is possible to perform the operation for establishing the connection of the cable 101 in an extremely simple manner. Moreover, the plug 120 can surely be engaged, and thus, it is possible to attain secure connection with the cable 101. Furthermore, it is possible to realize both easy unlocking properties and reliable locking properties.

Furthermore, the cable 101 is the hybrid cable having laminated therein the optical waveguide and the conductive wires 151. The plug 120 is provided with the optical path conversion portion 161 and the plug-side electric connection portion 153. The connector housing 11 is provided with the optical connection portion 16 and the electric connection portion 17. When the plug 120 is mounted on the connector housing 11, the optical path conversion portion 161 and the plug-side electric connection portion 153 oppose the optical connection portion 16 and the electric connection portion 17. Due to such a configuration, the plug 120 can be reduced in its entire size, and it is thus possible to perform a wiring operation of the cable 101 in an extremely simple manner. Moreover, the plug 120 can be surely engaged, and thus, it is possible to attain secure optical and electric connection with the cable 101. Furthermore, since the cable 101 is integrally formed by laminating therein the optical waveguide and the conductive wires 151, it is not necessary to wire the optical waveguide and the conductive wires 151 in an individual manner, and thus, the wiring operation is made easier.

While a preferred embodiment of the Present Application is shown and described, it is envisioned that those skilled in the art may devise various modifications without departing from the spirit and scope of the foregoing Description and the appended Claims.

What is claimed is:

1. An optical connector comprising:
a cable, the cable comprising an optical waveguide and a plurality of electrically conductive wires;

a plug, the plug having the cable connected thereto, the plug including a plug housing with a front edge, a generally planar lower surface, generally planar oppositely facing side surfaces, and a plug-side guide portion, the oppositely facing side surfaces being generally perpendicular to the lower surface, and the plug-side guide portion extending downward from the lower surface generally adjacent and spaced from the front edge; and a receptacle, the receptacle including a connector housing and a lock member, the connector housing including a rotation shaft and a plurality of contact portions, the plug being mounted in the connector housing such that each conductive wire is electrically connected to one of the contact portions, the lock member configured to move between an open position and a closed position by rotating about the rotation shaft, the connector housing including an upwardly facing connector-side guide portion, and a pair of side-facing abutting portions generally adjacent a rear portion of the receptacle connector, the upwardly facing connector-side guide portion engaging the plug-side guide portion, and each of the side-facing abutting portions engaging one of the side surfaces of the plug generally adjacent the front edge of the plug.

2. The optical connector of claim 1, wherein the plug housing is attached to the cable.

3. The optical connector of claim 1, wherein the plug-side guide portion comprises a plurality of convex projections extending downward from the lower surface of the plug housing.

4. The optical connector of claim 3, wherein the connector-side guide portion comprises a plurality of upwardly facing concave recesses formed in the connector housing so that a corresponding convex projection is matingly inserted into one of the concave recesses.

5. The optical connector of claim 4, wherein each concave recesses has an arc-shaped side face and a planar side face.

6. The optical connector of claim 5, wherein each convex projection is a columnar member having arc-shaped side face and a planar side face.

7. The optical connector of claim 1, wherein, when the lock member is maintained at an open position, the plug is mounted on the connector housing so that the cable-side guide portion is engaged with the connector-side guide portion.

8. The optical connector of claim 7, wherein, when the lock member is brought to a closed position, the plug is locked at the connector housing, thereby establishing a connection to the cable.

9. The optical connector of claim 8, wherein the plug housing includes a frame-shaped plug housing body and a plate-shaped plug top plate.

10. The optical connector of claim 9, wherein the plug housing body includes a pair of side wall portions and a rear crossbar portion configured to connect rear ends of the side wall portions with each other.

11. The optical connector of claim 10, wherein the cable comprises a hybrid cable, the hybrid cable including the optical waveguide and conductive wires laminated therein.

12. The optical connector of claim 11, wherein the plug includes a plug-side optical connection portion and a plug-side electric connection portion.

13. The optical connector of claim 12, wherein the connector housing includes an optical connection portion and an electric connection portion.

14. The optical connector of claim 13, wherein, when the plug is mounted on the connector housing, the plug-side optical connection portion and the plug-side electric connection portion oppose the optical connection portion and the electric connection portion, respectively.

15. The optical connector of claim 14, wherein the plug-side guide portion is configured to upstand from the plug-side optical connection portion.

* * * * *